US012811857B2

(12) United States Patent
Cui et al.

(10) Patent No.: US 12,811,857 B2
(45) **Date of Patent: *Nov. 24, 2026**

(54) FACILITATING METAVERSE SERVICE ORCHESTRATION AND HYBRID SOFTWARE DEFINING NETWORK CONTROL WITH POLICY ENABLED MULTIPLE INPUT MULTIPLE OUTPUT IN ADVANCED NETWORKS

(71) Applicant: AT&T Intellectual Property I, L.P., Atlanta, GA (US)

(72) Inventors: Zhi Cui, Sugar Hill, GA (US); Paul E. Smith, Jr., Heath, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 52 days.

This patent is subject to a terminal disclaimer.

(21) Appl. No.: 18/773,150

(22) Filed: Jul. 15, 2024

(65) Prior Publication Data

US 2024/0372786 A1 Nov. 7, 2024

Related U.S. Application Data

(63) Continuation of application No. 17/817,175, filed on Aug. 3, 2022, now Pat. No. 12,040,953.

(51) Int. Cl.
*H04L 41/122* (2022.01)
*H04L 41/0895* (2022.01)
*H04L 41/14* (2022.01)

(52) U.S. Cl.
CPC ........ *H04L 41/122* (2022.05); *H04L 41/0895* (2022.05); *H04L 41/14* (2013.01)

(58) Field of Classification Search
CPC .... H04L 41/122; H04L 41/0895; H04L 41/14
USPC .................................................. 709/223, 224
See application file for complete search history.

(56) References Cited

U.S. PATENT DOCUMENTS

| | | | | |
|---|---|---|---|---|
| 9,853,914 | B1 * | 12/2017 | Felstaine | H04L 69/00 |
| 11,086,474 | B2 * | 8/2021 | Lee | G06F 3/167 |
| 2013/0249947 | A1 * | 9/2013 | Reitan | G06T 19/006 345/633 |
| 2014/0063061 | A1 * | 3/2014 | Reitan | G09G 5/14 345/633 |
| 2016/0204916 | A1 * | 7/2016 | Dao | H04L 45/02 709/226 |
| 2018/0309808 | A1 * | 10/2018 | Andon | G06T 19/20 |
| 2021/0076470 | A1 * | 3/2021 | Graff | H05B 47/175 |

(Continued)

*Primary Examiner* — Liang Che A Wang
(74) *Attorney, Agent, or Firm* — Guntin & Gust, PLC; Andrew Gust

(57) ABSTRACT

Facilitating metaverse service orchestration and hybrid software defining network control with policy enabled multiple input multiple output in advanced networks is provided herein. Operations of a system include identifying physical resources associated with a physical network and virtual resources associated with a virtual network. The physical resources and the virtual resources are determined to be utilized for fulfillment of a service request. The operations can also include combining the physical resources and the virtual resources into a composition of mixed resources. The composition of mixed resources can include the physical resources and the virtual resources. Further, the operations can include rendering, in a perceivable format, the composition of mixed resources in response to the service request.

20 Claims, 9 Drawing Sheets

(56) References Cited

U.S. PATENT DOCUMENTS

| | | | | |
|---|---|---|---|---|
| 2022/0240779 | A1 * | 8/2022 | Peyman | A61B 5/0066 |
| 2022/0357936 | A1 * | 11/2022 | Duggal | H04L 63/20 |

* cited by examiner

FACILITATING METAVERSE SERVICE ORCHESTRATION AND HYBRID SOFTWARE DEFINING NETWORK CONTROL WITH POLICY ENABLED MULTIPLE INPUT MULTIPLE OUTPUT IN ADVANCED NETWORKS

This application is a continuation of U.S. patent application Ser. No. 17/817,175, filed on Aug. 3, 2022, now U.S. Pat. No. 12,040,953, which is herein incorporated by reference in its entirety.

TECHNICAL FIELD

This disclosure relates generally to the field of mobile communications and, for example, to metaverse services in advanced networks, e.g., Fourth Generation (4G) networks, Fifth Generation (5G) networks, Sixth Generation (6G) networks, or beyond.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) or other advanced standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which:

FIG. 10 illustrates an example, non-limiting, block diagram of a computer operable to engage in a system architecture that facilitates wireless communications according to one or more embodiments described herein.

DETAILED DESCRIPTION

Figure 1:
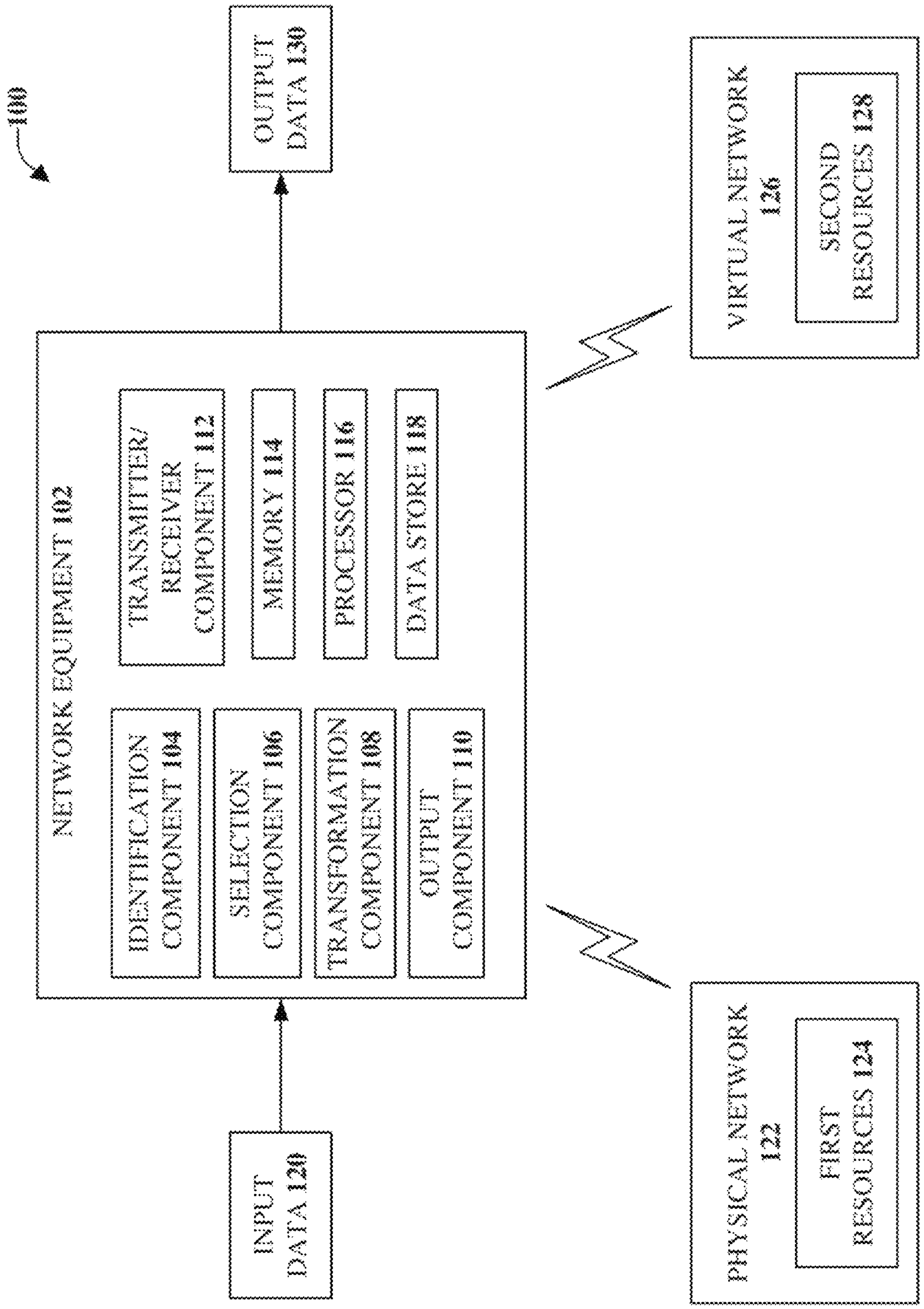
FIG. 1 illustrates an example, non-limiting, system that facilitates providing a metaverse experience in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

With the increasing use of various computing devices, also referred to as user equipment (UE), there is a growing interest among users for performing various functions (e.g., games, discussions, training, and so on) with other users, regardless of where the users are located. For example, the users could be located in different rooms, different buildings, different cities, different states, different countries, and so on, or combinations thereof. There is also a growing interest in performing the various functions even when there is not another physical user present and, therefore, the various functions are performed with computing equipment that facilitates representation of a user (e.g., as an avatar). Accordingly, described herein are systems, methods, articles of manufacture, and other embodiments or implementations that can facilitate metaverse service orchestration and hybrid software defining network control with policy enabled multiple input multiple output in advanced networks.

According to an embodiment a method can include, based on a received request, determining, by a system comprising a processor, a first resource associated with a physical network and a second resource associated with a virtual network. The method can also include merging, by the system, the first resource and the second resource into a combination network that comprises the physical network and the virtual network. Further, the method can include outputting, by the system, combination data representative of the combination network in response to the received request.

In some implementations, determining the first resource and the second resource can include evaluating a first group of resources of the physical network and a second group of resources of the virtual network. Further, determining the first resource and the second resource can include selecting the first resource from the first group of resources and the second resource from the second group of resources. Selecting the first resource and the second resource can include identifying a compatibility between the first resource and the second resource.

In an example, the first resource can include a first resource port and the second resource can include a second resource port. Further to this example, the method can include interconnecting, by the system, the first resource port and the second resource port via an interface. Additionally, the first resource port and the second resource port can include respective logical resources and respective physical resources. Alternatively, or additionally, the interconnecting can include chaining the first resource port and the second resource port.

According to some implementations, the method can include receiving, by the system, information indicative of a change to the first resource. The method can also include selecting, by the system, a third resource. In an example, the third resource can supersede the first resource. Further, the method can include updating, by the system, the combination network with the second resource and the third resource.

In an example, outputting the combination data can include facilitating a display of the combination network via a heads up display. According to another example, outputting the combination data can include facilitating a display of the second resource as an avatar that is perceivable in the physical network. According to yet another example, outputting the combination data can include facilitating a rendering of the combination network as a mixture of physical objects and virtual objects. In yet another example, outputting the combination data can include outputting the combination data representative of the combination network via a communication network configured to operate according to a new radio network communication protocol.

Another embodiment relates to a system that includes a processor and a memory that stores executable instructions that, when executed by the processor, facilitate performance of operations. The operations can include, based on a request, selecting a first resource from a first group of resources associated with a physical world and a second resource from a second group of resources associated with a virtual world. The operations can also include combining the first resource and the second resource. The combining can include creating a metaverse service that is responsive to the request. Further, the operations can include rendering information indicative of the metaverse service in response to the request.

In an example, the first resource is a logical port comprising first network equipment. In another example, the first resource and the second resource are respective voice related resources.

According to some implementations, the operations can include identifying a change to the first resource. Based on the change, the operations can include selecting a third resource from the first group of resources. Further, the operations can include adapting a capability of the metaverse service. In an example, performing the adapting can include replacing the first resource with the third resource.

In some implementations, the rendering can include displaying the information indicative of the metaverse service via a heads up display. According to some implementations, the rendering can include outputting the information indicative of the metaverse service via a communication network configured to operate according to at least a fifth generation network communication protocol.

A further embodiment relates to a non-transitory machine-readable medium, comprising executable instructions that, when executed by a processor of network equipment, facilitate performance of operations. The operations can include identifying physical resources associated with a physical network and virtual resources associated with a virtual network. The physical resources and the virtual resources are determined to be utilized for fulfillment of a service request. The operations can also include combining the physical resources and the virtual resources into a composition of mixed resources. The composition of mixed resources can include the physical resources and the virtual resources. Further, the operations can include rendering, in a perceivable format, the composition of mixed resources in response to the service request.

In an example, the rendering can include facilitating an interaction between the physical network and the virtual network. According to some implementations, the operations can include, prior to the identifying, establishing a global view of the physical network and the virtual network based on the service request.

In further detail, FIG. 1 illustrates an example, non-limiting, system 100 that facilitates providing a metaverse experience in accordance with one or more embodiments described herein. The system 100, as well as other embodiments, can be configured as a metaverse for network equipment and/or User Equipment (UE) configured to operate according to a Long-Term Evolution (LTE) network communication protocol, a fourth generation (4G) network communication protocol, a fifth generation (5G) network communication protocol, a sixth generation (6G) network communication protocol, a new radio (NR) network communication protocol, and/or other advanced network communication protocols.

Aspects of systems (e.g., the system 100 and the like), equipment, network equipment, UEs, devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

As mentioned, the system 100 facilitates metaverse service orchestration. Metaverse is a digital world for the next generation of the internet. The system 100 includes network equipment 102 that includes an identification component 104, a selection component 106, a transformation component 108, an output component 110, a transmitter/receiver component 112, at least one memory 114, at least one processor 116, and at least one data store 118. In various embodiments, one or more of: the identification component 104, the selection component 106, the transformation component 108, the output component 110, the transmitter/receiver component 112, the at least one memory 114, the at least one processor 116, and the at least one data store 118, can be electrically and/or communicatively coupled to one another to perform one or more of the functions of the network equipment 102. In some embodiments, one or more of: the identification component 104, the selection component 106, the transformation component 108, the output component 110, and the transmitter/receiver component 112 can include software instructions stored on the at least one memory 114 and/or the at least one data store 118 and executed by the at least one processor 116. The network equipment 102 can also interact with other hardware and/or software components not depicted in FIG. 1.

The network equipment 102 can receive (e.g., via the transmitter/receiver component 112) one or more input signals or input data 120 that includes at least information indicative of one or more requested services. The input data 120 can be received from one or more User Equipment (UE), other network equipment, or other equipment.

Based on the input data 120, the identification component 104 can determine a first group of first resources associated with a physical network 122 and a second group of second resources associated with a virtual network 126. The one or more first resources and the one or more second resources can be determined by the identification component 104 based on a determination that the one or more first resources and the one or more second resources are expected to fulfill the service request.

The first group of first resources and/or the second group of second resources can include logical ports. For example, first resources of the first group of first resources can include respective logical ports of the physical network 122. Further, second resources of the second group of second resources can include respective logical ports of the virtual network 126. The second resources can also include one or more objects, a community of objects, one or more avatars, metadata, and so on.

In an additional or alternative example, the first group of first resources can include respective services (e.g., voice, video, security, gigabyte passive optical network (GPON), user plane function (UPF), gNBs, eNBS, and so on). Further, the second group of second resources can include various physical and/or virtual resources. For example, the physical resources can include network resources (e.g., network equipment) and the virtual resources can include various processing and data resources.

The selection component 106 can select at least a first resource from the first group of first resources and at least a second resource from the second group of second resources. For example, at least the first resource and at least the second resource can be selected by the selection component 106 based on fulfillment of the service request.

The first resource and the second resource can be combined, by the transformation component 108. To combine the resources, the transformation component 108 can configure to resources to operate with one another. For example, information indicative of the resources (e.g., identification information, capability information, formatting information, communication information, and so on) can be shared among the resources. The combination by the transformation component 108 can include creating a metaverse service that is responsive to the service request.

Figure 2:
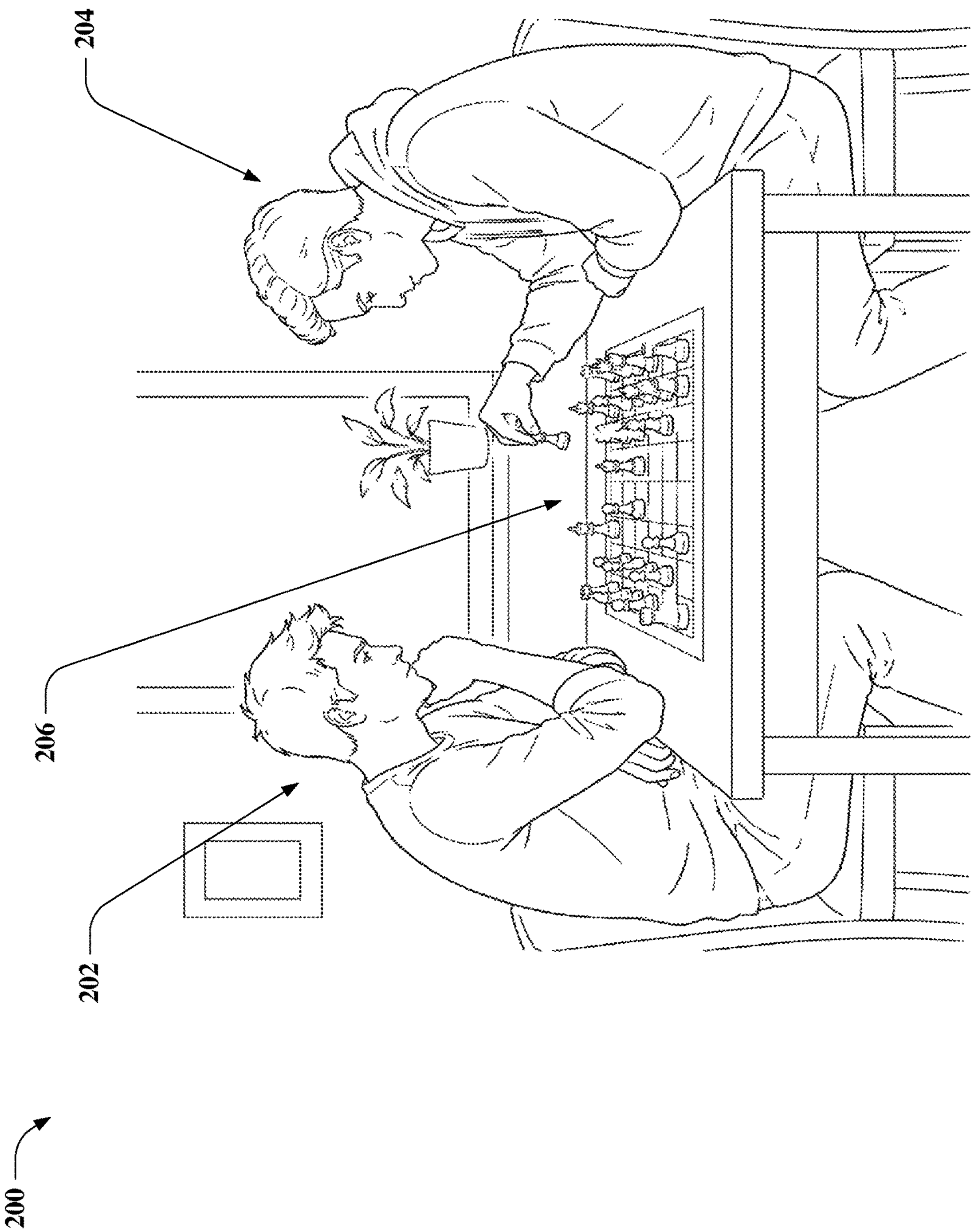
FIG. 2 illustrates an example, non-limiting, representation of a rendering of the metaverse service in accordance with one or more embodiments described herein.

The output component 110 can facilitate a rendering of information indicative of the metaverse service. The information indicative of the metaverse service can be output as one or more signals (e.g., as output data 130). The rendering can be performed at a UE, or more than one UE. In a non-limiting example, the rendering can be via a heads-up display. In another example, the rendering can be output as an overlay on a physical world (e.g., as an avatar). For example, FIG. 2 illustrates an example, non-limiting, representation 200 of a rendering of the metaverse service in accordance with one or more embodiments described herein. In the example of FIG. 2, the request is to play a game, specifically chess, which requires two users. It is noted that although various embodiments are discussed with respect to a board game (e.g., chess), the disclosed embodiments are not limited to this implementation. Instead, other types of interactions between one or more real-world users; between one or more real-world users and one or more virtual “users”, and combinations thereof can be facilitated with the embodiments discussed herein. Examples of interactions can include, meetings, conference calls, discussions, games, learning environments, teaching environments, corporate environments, and any other type of interaction.

A first user 202 is physically located at a table, such as in a park as illustrated. The first user 202, via a UE, can send a request to the network equipment 102 to play the game. Since another user is not physically at the same location as the first user 202, the network equipment 102 can coordinate the merging of resources from the physical network 122 and from the virtual network 126 in order to fulfill the request. Thus, the metaverse service that is output, in this example, as perceivable in the physical world includes a second user 204, represented as an avatar. Further, the game 206 can also be virtually represented as an avatar within the physical environment.

With continuing reference to FIG. 1, the at least one memory 114 can be operatively connected to the at least one processor 116. The at least one memory 114 and/or the at least one data store 118 can store executable instructions that, when executed by the at least one processor 116 can facilitate performance of operations. Further, the at least one processor 116 can be utilized to execute computer executable components stored in the at least one memory 114 and/or the at least one data store 118.

For example, the at least one memory 114 can store protocols associated with facilitating metaverse service orchestration as discussed herein. Further, the at least one memory 114 can facilitate action to control communication between the system 100, other systems, equipment, network equipment, and/or user equipment such that the system 100 can employ stored protocols and/or processes to facilitate providing metaverse services and experiences as described herein.

It should be appreciated that data stores (e.g., memories) components described herein can be either volatile memory or nonvolatile memory or can include both volatile and nonvolatile memory. By way of example and not limitation, nonvolatile memory can include read only memory (ROM), programmable ROM (PROM), electrically Programmable ROM (EPROM), Electrically Erasable ROM (EEPROM), or flash memory. Volatile memory can include Random Access Memory (RAM), which acts as external cache memory. By way of example and not limitation, RAM is available in many forms such as Synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DRRAM). Memory of the disclosed aspects are intended to include, without being limited to, these and other suitable types of memory.

The at least one processor 116 can facilitate metaverse service orchestration as discussed herein. The at least one processor 116 can be a processor dedicated to analyzing and/or generating information received, a processor that controls one or more components of the system 100, and/or a processor that both analyzes and generates information received and controls one or more components of the system 100.

Figure 3:
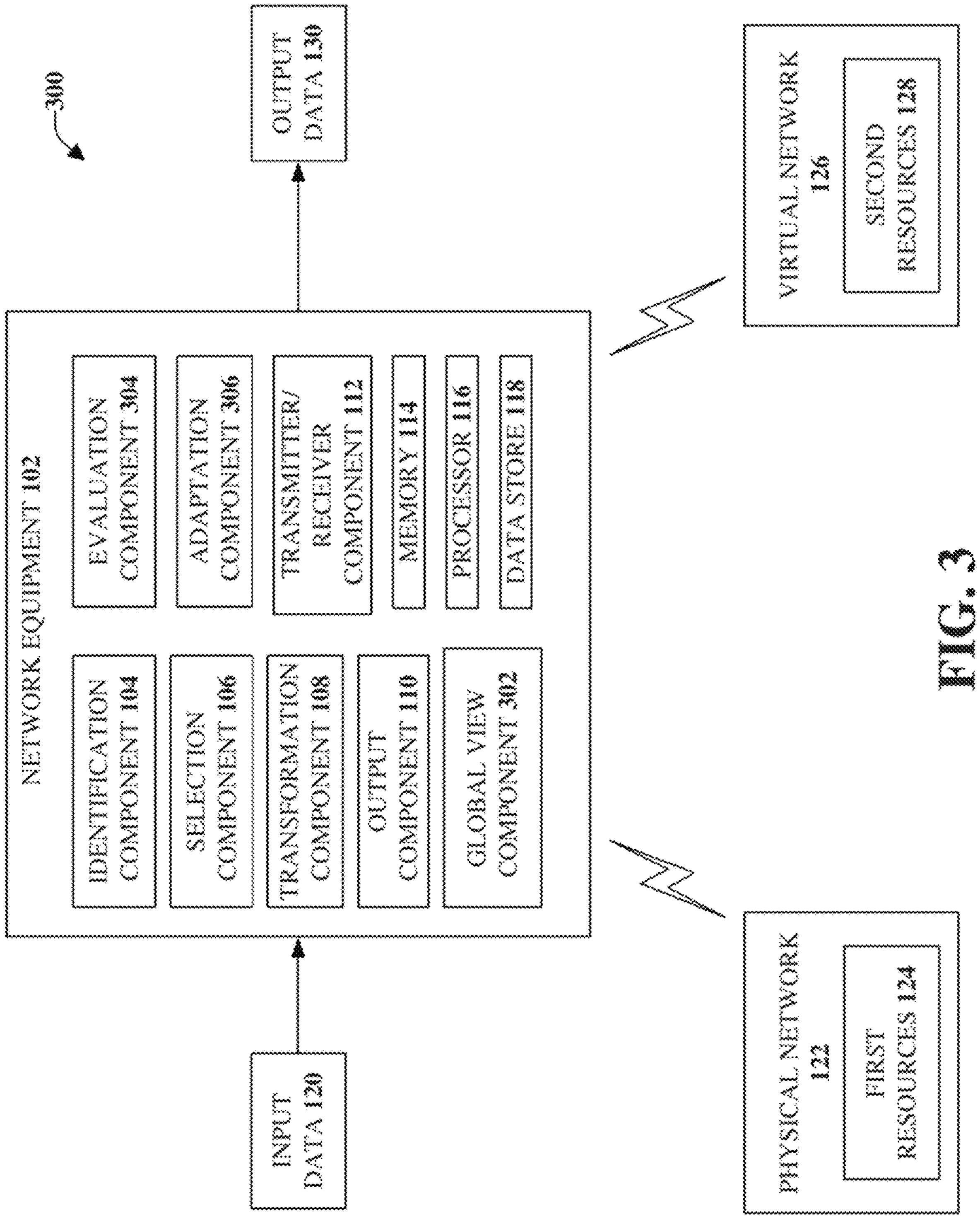
FIG. 3 illustrates another example, non-limiting, system that facilitates providing a metaverse service in accordance with one or more embodiments described herein.

FIG. 3 illustrates another example, non-limiting, system 300 that facilitates providing a metaverse service in accordance with one or more embodiments described herein. The system 300 can comprise one or more of the components and/or functionality of the system 100, and vice versa.

As illustrated, the network equipment 102 includes a global view component 302, an evaluation component 304, and an adaptation component 306. In various embodiments, one or more of: the identification component 104, the selection component 106, the transformation component 108, the output component 110, the transmitter/receiver component 112, the at least one memory 114, the at least one processor 116, the at least one data store 118, the global view component 302, the evaluation component 304, and the adaptation component 306 (as well as other components discussed herein) can be electrically and/or communicatively coupled to one another to perform one or more of the functions of the network equipment 102. In some embodiments, one or more of: the identification component 104, the selection component 106, the transformation component 108, the output component 110, the transmitter/receiver component 112, the global view component 302, the evaluation component 304, and the adaptation component 306 (as well as other components discussed herein) can include software instructions stored on the at least one memory 114 and/or the at least one data store 118 and executed by the at least one processor 116.

The global view component 302 can, prior to the identification component 104 determining the first group of first resources and the second group of second resources, establish a global view of the physical network 122 and the virtual network 126. The global view can include a view or understanding (e.g., information indicative of) the available resources (e.g., the first group of first resources and the second group of second resources). Further, the global view can include information indicative of how the resources can be connected or utilized with one another.

Over time, the physical network 122 and/or the virtual network 126 might change. For example, one or more respective resources might become unavailable and/or might become available. In another example, changes associated with a physical environment might change (e.g., a UE might be moved, a first UE might be transferred to a second UE (e.g., a mobile device might move within range of a vehicle communication device and the communication source changes), and so on. Changes to the virtual environment can include adding one or more "users," content associated with the newly added "users," physical resources associated with a location of the newly added "users." In a similar manner, removal of one or more "users" from the virtual world and/or physical world can result in changes to the physical resources and/or content.

The evaluation component 304 can identify a change to one or more of the resources of the first group of first resources and/or the second group of second resources. Based on the indication of the change as determined by the evaluation component 304, the selection component 106 can select another resource. For example, the selection component 106 can select another first resource of the first group of resource and/or another second resource of the second group of second resources.

The adaptation component 306 can adapt a capability of the metaverse service (e.g., the output data 130). To adapt the capability, the adaptation component 306 can replace a resource with the updated or newly selected resources. For example, the adaptation component 306 can replace the first resource with another resource from the first group of first resources. Alternatively, or additionally, the adaptation component 306 can replace the second resource with another second resource from the second group of second resources. According to some implementations, resources might be added, without removal of other resources. In some implementations, more than one resource can be added and/or removed.

According to some implementations, feedback information related to the metaverse service provided and/or the metaverse services experienced can be received (via the transmitter/receiver component 112). For example, feedback from one or more users can be requested and fed back to the evaluation component 304 and/or other system components. Based on this feedback data, as well as other data, the selection component 106 and/or other system components can modify one or more parameters and/or resources from the physical network 122 and/or the virtual network 126 for providing metaverse services in the future.

Figure 4:
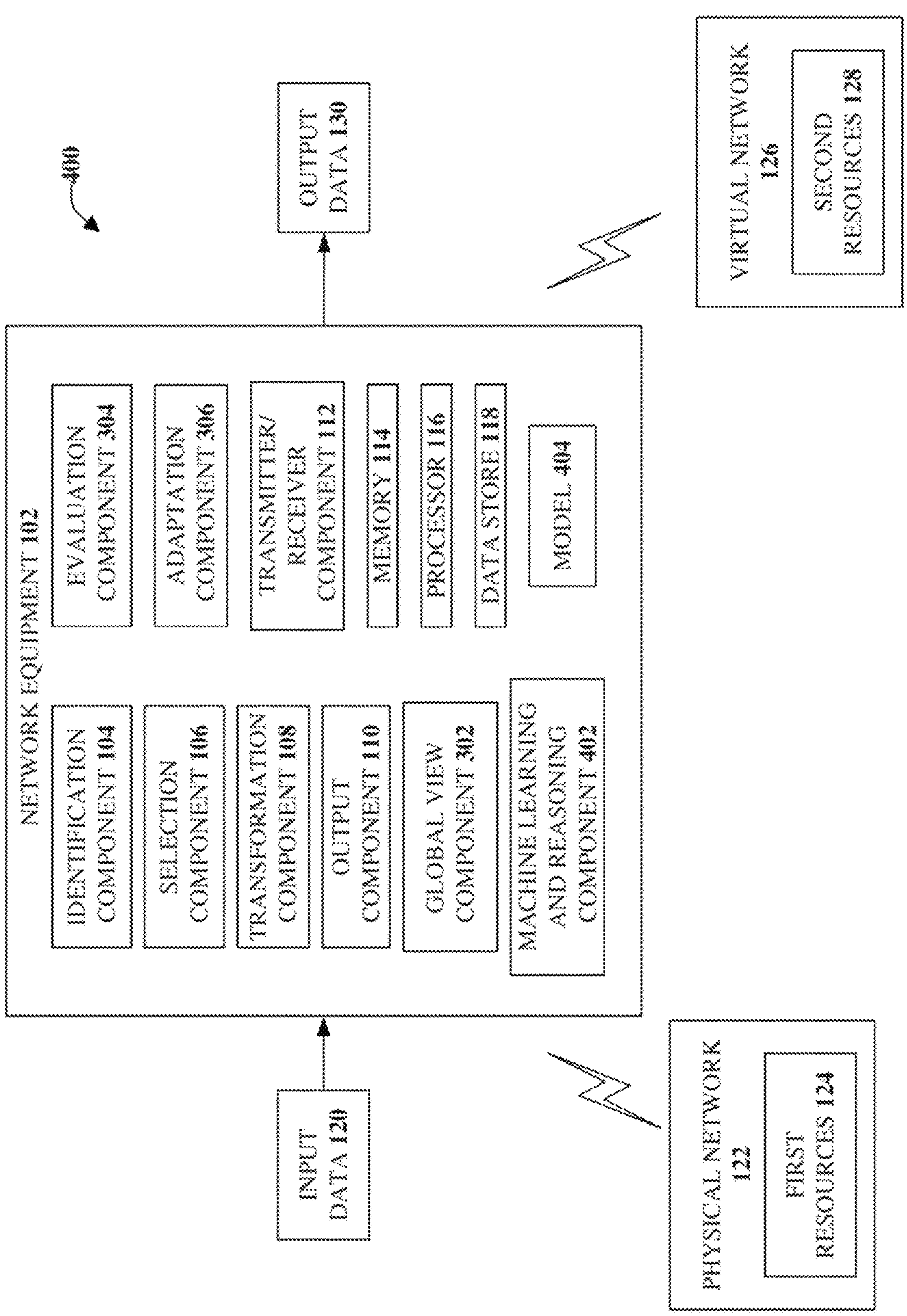
FIG. 4 illustrates an example, non-limiting, system that employs automated learning that trains a model to facilitate one or more of the disclosed aspects in accordance with one or more embodiments described herein.

FIG. 4 illustrates an example, non-limiting, system 400 that employs automated learning that trains a model to facilitate one or more of the disclosed aspects in accordance with one or more embodiments described herein. Repetitive description of like elements employed in other embodiments described herein is omitted for sake of brevity. The system 400 can comprise one or more of the components and/or functionality of the system 100, the system 300, and vice versa.

The system 400 can utilize machine learning to train a model to identify opportunities related to providing metaverse services. The model can be trained to a defined confidence level. As illustrated, the system 400 can comprise a machine learning and reasoning component 402 that can be utilized to automate one or more of the disclosed aspects based on training a model 404. The machine learning and reasoning component 402 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 402 can employ principles of probabilistic and decision theoretic inference. Additionally, or alternatively, the machine learning and reasoning component 402 can rely on predictive models (e.g., the model 404) constructed using automated learning and/or automated learning procedures. Logic-centric inference can also be employed separately or in conjunction with probabilistic methods.

The machine learning and reasoning component 402 can infer which resources of the physical network 122 and which resources of the virtual network 126 should be utilized to satisfy a service request (e.g., the input data 120) and/or how to merge the resources together to provide the metaverse service. In another example, the machine learning and reasoning component 402 can infer information related to how to output the metaverse services.

As used herein, the term "inference" refers generally to the process of reasoning about or inferring states of a system, a component, a module, an environment, and/or devices from a set of observations as captured through events, reports, data and/or through other forms of communication. Inference can be employed to identify when corrective measures, such as selectively changing one or more resources based on changing network conditions and/or conditions associated with user equipment, what actions should be taken to improve a user experience, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with providing metaverse services in 4G communication networks, 5G communication networks, 6G communication networks, new radio communication networks, and/or other advanced networks) can employ various artificial intelligence-based schemes for carrying out various aspects thereof. For example, a process for determining if one or more resources are available (or are expected to be available) to dynamically provide a metaverse experience, how to merge services, objects, and/or resources of physical network and virtual networks, and so on can be enabled through an automatic classifier system and process.

A classifier is a function that maps an input attribute vector, x=(x1, x2, x3, x4, xn), to a confidence that the input belongs to a class. In other words, f(x)=confidence (class). Such classification can employ a probabilistic and/or statistical-based analysis (e.g., factoring into the analysis utilities and costs) to provide a prognosis and/or infer one or more actions that should be employed to determine when and how to merge physical and/or virtual resources, which resources to merge, how to output metaverse services based on the merging of resources. In the case of priorities, for example, attributes can be identification of one or more resources available across physical and virtual networks and/or an inferred amount of processing capability that is expected to be utilized to provide the metaverse experience, and so on.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing equipment feedback associated with utilization of resources across physical and/or virtual networks, an efficiency associated with selection of resources as compared to other resources not selected, and so on, by receiving extrinsic information (e.g., one or more signals from the equipment), by receiving implicit information, based on an inference, and so on). For example, SVMs can be configured through a learning or training phase within a classifier constructor and feature selection module. Thus, a classifier(s) can be used to automatically learn and perform a number of functions, including but not limited to determining, according to a predetermined criterion, which resources to select, how to combine the resources, when to change one or more resources, and so forth. The criteria can include, but is not limited to, historical information, feedback information, the resources that are available, a processing capability needed to provide the metaverse experience, and so forth.

Additionally, or alternatively, an implementation scheme (e.g., a rule, a policy, and so on) can be applied to control the formation of metaverse services via utilization of various resources, controlling the delivery of metaverse services, and so forth. In some implementations, based upon a predefined criterion, the rules-based implementation can automatically and/or dynamically interpret priority of resources over other resources, for example. In response thereto, the rule-based implementation can automatically interpret and carry out functions associated with the delivery of metaverse services while mitigating and/or reducing an amount of processing bandwidth and/or memory loss during the metaverse service delivery, by employing a predefined and/or programmed rule(s) based upon any desired criteria.

According to some implementations, seed data (e.g., a data set) can be utilized as initial input to the model 404 to facilitate the training of the model 404. In an example, if seed data is utilized, the seed data can be obtained from one or more historical data associated with available resources, merging of different types of resources, delivery of the metaverse services and/or metaverse experience, and so on. However, the disclosed embodiments are not limited to this implementation and seed data is not necessary to facilitate training of the model 404. Instead, the model 404 can be trained on new data received (e.g., the input data 120, a feedback loop, and so on).

The data (e.g., seed data and/or new data) can be collected and, optionally, labeled with various metadata. For example, the data can be labeled with an indication of the communication protocol being utilized for communication amongst the equipment, respective applications executing on the equipment, or other data, such as identification of respective equipment that provided one or more resources, feedback from one or more users related to the metaverse services received, feedback from one or more users related to the metaverse experience, and so on.

Figure 5:
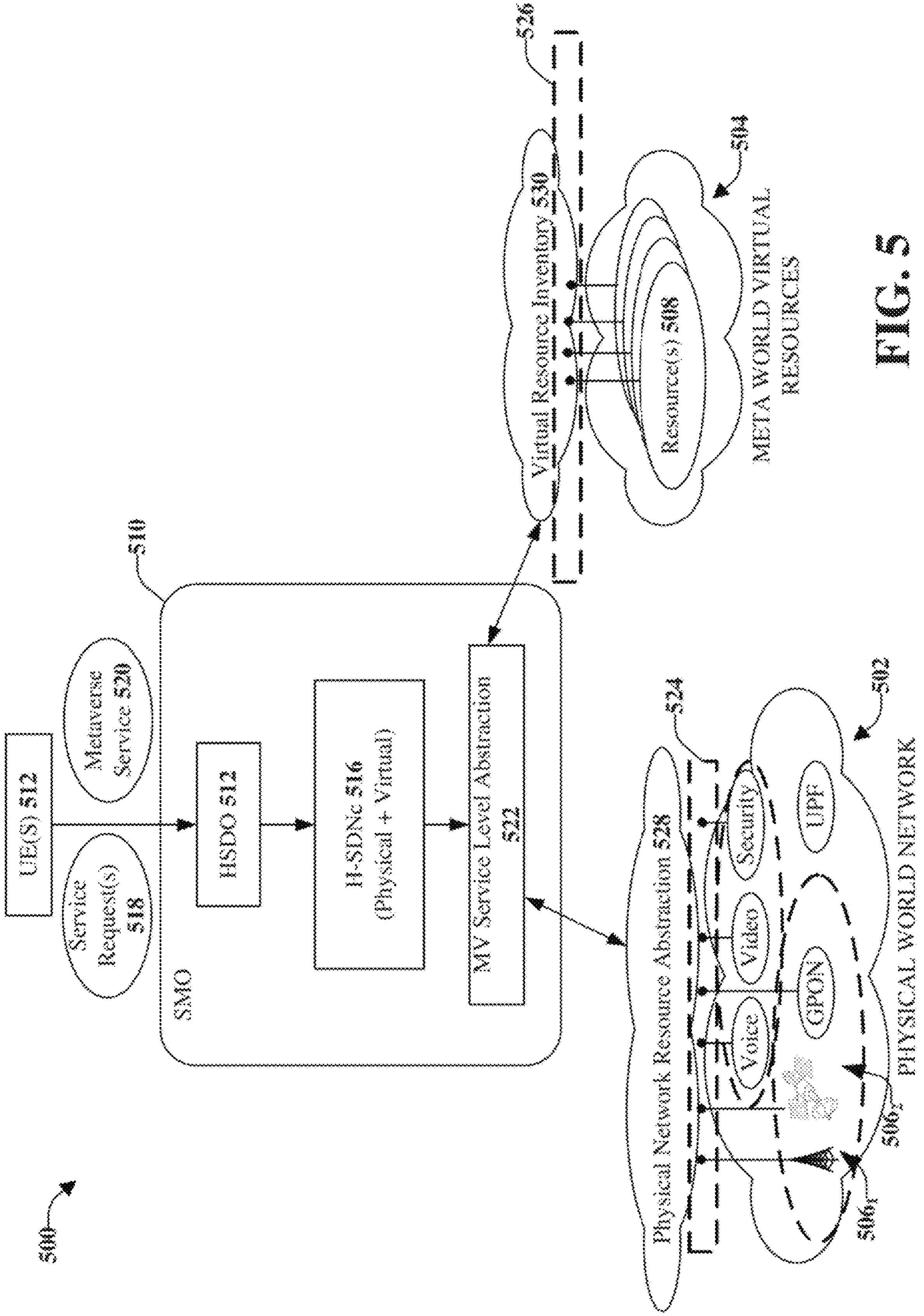
FIG. 5 illustrates an example, non-limiting, system that facilitates metaverse service orchestration and hybrid software defining network control with policy enabled multiple input multiple output in advanced networks in accordance with one or more embodiments described herein.

FIG. 5 illustrates an example, non-limiting, system 500 that facilitates metaverse service orchestration and hybrid software defining network control with policy enabled multiple input multiple output in advanced networks in accordance with one or more embodiments described herein. Repetitive description of like elements employed in other embodiments described herein is omitted for sake of brevity. The system 500 can comprise one or more of the components and/or functionality of the system 100, the system 300, the system 400, and vice versa.

Metaverse can have connection and interaction between a physical world network 502 (e.g., the physical network 122) and a virtual world network 504 (e.g., the virtual network 126). The physical world network 502 includes various resources (e.g., the first resources 124). In the example of FIG. 5, the resources include, but are not limited to, network equipment 5061 and 5062 (e.g., gNBs, eNBs, satellites, or other types of network equipment). The resources can also include services, such as voice, video, security, and so on. Further, the resources can include a gigabyte passive optical network (GPON), a user plane function (UPF), and so on. The virtual world network 504 comprises one or more resources 508 (e.g., the second resources 128), which can include virtual and/or physical resources.

Also included in the system 500 is network equipment 510 (e.g., the network equipment 102) and a user equipment (a UE 512). It is noted that although a single user equipment and a single network equipment are illustrated and described, the disclosed embodiments are not limited to this implementation. Instead, there can be more than one user equipment and/or more than one network equipment included in the system 500.

In various embodiments, the network equipment 510, the UE 512, other equipment, and so on, can be any type of component, machine, device, facility, apparatus, and/or instrument that includes a processor and/or can be capable of effective and/or operative communication with a wired and/or wireless network. Components, machines, apparatuses, devices, facilities, and/or instrumentalities that can include the network equipment 510, the UE 510, other equipment, other UEs, and so on, can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like. Further, according to some implementations, the network equipment 510, the UE 512, other UEs, and so on can be classified as Internet of Things (IoT) devices, as Internet of Everything (IoE) devices, electric vehicles (including unmanned vehicles, which can be unmanned aerial vehicles), or the like.

As illustrated the network equipment 510 can be service management and orchestration (SMO) equipment. The SMO equipment can include a Hybrid Service Design and Orchestration equipment (HSDO 512) and a Hybrid Software Defining Network Controller (H-SDNc 516). As utilized herein "hybrid" refers to an interconnection of physical world aspects and metaverse (e.g., virtual world) aspects.

Based upon a service request 518, or more than one service request (e.g., the input data 120) from the UE 512, the HSDO 512 can create a service. For example, the HSDO 512 can perform selection and composition of the resources from each world (e.g., the physical world network 502, the virtual world network 504) that meet the parameters of the service request 518.

For example, the service request 518 can be a request from a user to play a game of chess, following the above example. To fulfill the request, the network equipment 510 can utilize one or more resources from the physical world network 502 and one or more resources from the virtual world network 504 in order to fulfill the service request 518, which can be output as a metaverse service 520 (e.g., the output data 130).

The HSDO 512 can create the metaverse service 520 based on various parameters and based on a determination that elements from the physical side and the virtual side are needed to fulfil the request. For example, the HSDO 512 can create the metaverse service 520 based on one or more community objectives and/or one or more community intents. Considerations can include, for example, who and/or where "people" can meet, what they can do, the application and/or service requirements and/or needs. The considerations can also take into account policy and user preference. As utilized herein, a person can be an actual person located at a same location as the user that sent the service request, at a different location, and/or can be a virtual person (e.g., a person created by the network equipment or other equipment). In an example, of when the "person" is not at the same location as the user that sent the service request, the metaverse service 520 can output the "person" as an avatar with a physical network of the service requestors, as discussed with respect to FIG. 2.

According to some implementations, the network equipment 510 (e.g., the HSDO 512) can operate on the service level with multiple metaverse inputs and outputs (MM-MIMO) from both physical and virtual worlds. For example, the input can include both virtual objects (e.g., meta-conference) and physical resources and instances (e.g., telepresence, and so on). The output can be in the virtual world and, further, can be brought back to the physical world with the representations, and/or a mixture of both the virtual world and the physical world.

Further, the H-SDNc 516 can be configured for chaining metaverse resource ports including physical and virtual. For example, the H-SDNc 516 can have a global view of the virtual communities, virtual resources, and physical resources including wireline, wireless, RAN, core, transport, MEC, and so on.

Upon the metaverse service level composition by the HSDO 512, the H-SDNc 516 instantiates the virtual communities and the relevant resources with the proper distribution and interconnections. For example, the resources can include physical resources and/or virtual resources. The resources can be in the form of universal ports (e.g., similar to Lego® blocks), that can be interconnected with interfaces, which according to some implementations can be standard interfaces. Further, universal ports in the Service-Based Architecture (SBA) can be extended to the Metaverse (e.g., the universal ports include both logical resources and physical resources from both worlds (e.g., the physical world network 502 and the virtual world network 504)).

The H-SDNc 516 and the HSDO 512 can cooperate to allow dynamic changes of the resources and their respective connections depending on the virtual community changes, as well as the physical location of the users, the physical location of the interface equipment, and so on.

There can be a level of abstraction between the worlds (e.g., the physical world network 502 and the virtual world network 504), which is illustrated as a metaverse (MV) service level abstraction 522. The H-SDNc 516 can chain metaverse resource ports (e.g., universal resource ports 524 and 526). The MV service level abstraction 522 can receive, as first input, one or more physical network resource abstractions 528, which are based on the one or more first resources. The MV service level abstraction 522 can also receive, as second input, information indicative of a virtual resource inventory 530.

Figure 6:
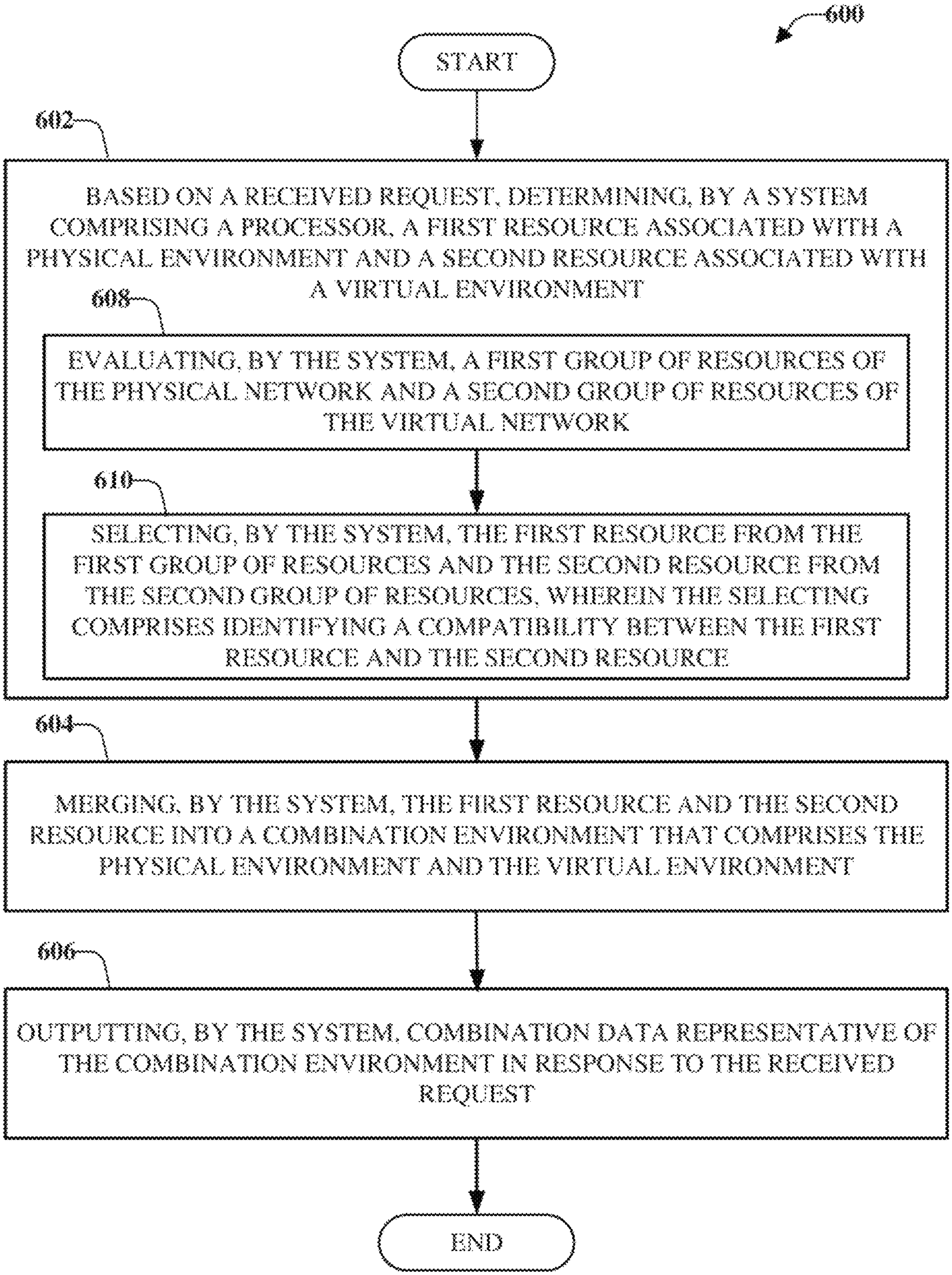
FIG. 6 illustrates an example, non-limiting, computer-implemented method for facilitating metaverse service orchestration and hybrid software defining network control with policy enabled multiple input multiple output in accordance with one or more embodiments described herein.

FIG. 6 illustrates an example, non-limiting, computer-implemented method 600 for facilitating metaverse service orchestration and hybrid software defining network control with policy enabled multiple input multiple output in accordance with one or more embodiments described herein. Repetitive description of like elements employed in other embodiments described herein is omitted for sake of brevity. The computer-implemented method 600 can be implemented by a system including a memory and a processor, user equipment including memory and a processor, network equipment including a memory and a processor, a network controller including a memory and a processor, or another computer-implemented device including a memory and a processor.

The computer-implemented method 600 starts, at 602, with determining, by a system comprising a processor, a first resource associated with a physical network and a second resource associated with a virtual network. The determining at 602 can be based on a received request. Further, at 604, the computer-implemented method 600 merges the first resource and the second resource into a combination network that comprises the physical network and the virtual network. Combination data representative of the combination network can be output, at 606, in response to the received request.

According to some implementations, the determining at 602 can include evaluating, at 608, a first group of resources of the physical network and a second group of resources of the virtual network. Further, at 610, the first resource is selected from the first group of resources and the second resource is selected from the second group of resources. For example, selecting the first resource and the second resource can include identifying a compatibility between the first resource and the second resource.

In an example, the first resource can include a first resource port and the second resource can include a second resource port. Further to this example, the computer-implemented method 600 can include interconnecting, by the system, the first resource port and the second resource port via an interface. In some implementations, the first resource port and the second resource port can include respective logical resources and respective physical resources. According to some implementations, the interconnecting can include chaining the first resource port and the second resource port.

Figure 7:
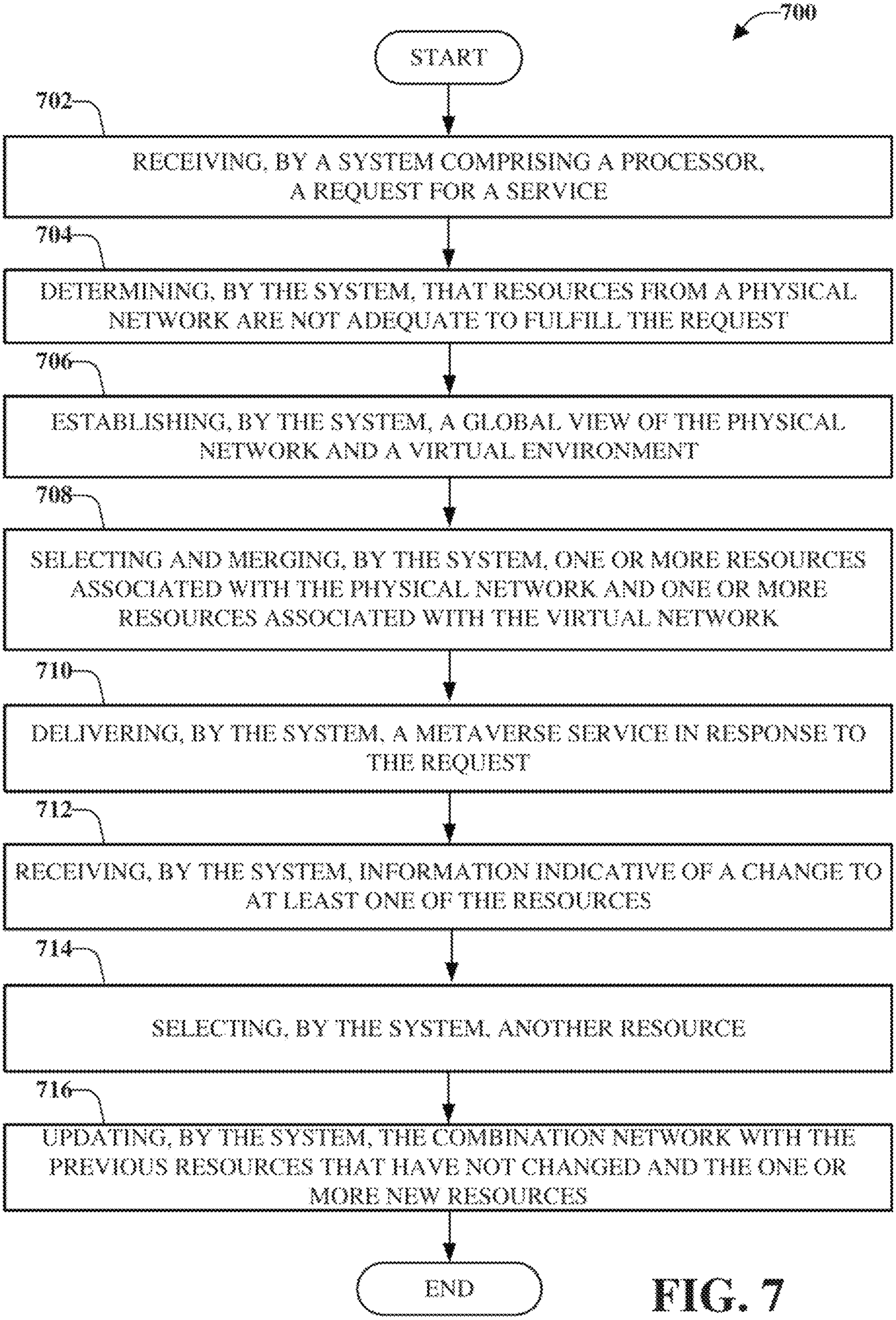
FIG. 7 illustrates an example, non-limiting, computer-implemented method for providing metaverse services in accordance with one or more embodiments described herein.

FIG. 7 illustrates an example, non-limiting, computer-implemented method 700 for providing metaverse services in accordance with one or more embodiments described herein. Repetitive description of like elements employed in other embodiments described herein is omitted for sake of brevity. The computer-implemented method 700 can be implemented by a system including a memory and a processor, user equipment including memory and a processor, network equipment including a memory and a processor, a network controller including a memory and a processor, or another computer-implemented device including a memory and a processor.

The computer-implemented method 700 starts, at 702, when a service request is received. For example, the service request can be received from one or more UEs. At 704, a determination is made that resources from a physical network are not adequate to support the service request. Thus, at 706, a global view of the physical network and a virtual network is established based on the determination at 704.

Based on the global view, at 708, one or more resources associated with the physical network and one or more resources associated with the virtual network are selected and merged. The merged resources are utilized to deliver a metaverse service in response to the request.

At 710, information indicative of a change to at least one of the resources is received. For example, the change can be that the resource is no longer available. In another example, the change can be prompted based on feedback received from one or more users. Based on the change, another resource can be selected at 712. The other resource can be utilized, at 714, to supersede or replace the resource that has changed (or is determined to need to be changed based on the feedback). Further, at 716, the combination network is updated with the previous resources that have not changed and the one or more new resources.

Described herein are systems, methods, articles of manufacture, non-transitory machine-readable medium, and other embodiments or implementations that can facilitate metaverse service orchestration and hybrid software defining network control with policy enabled multiple input multiple output in advanced networks. Metaverse is a digital world for the next generation of the internet. Metaverse can have connection and interaction between physical and virtual worlds. The embodiments discussed herein include a HSDO for the service creation and the selection and composition of the resources from each world that meets the service needs. The HSDO creates the metaverse service based on community objectives and/or intent on who and/or where "people" can meet, what the "people" can do, the application and service requirements and/or needs, which can also take into account policies and/or user preferences. The H-SDNc can be utilized for chaining metaverse resource ports (including physical resource ports and virtual resource ports) and instantiates the virtual communities and the relevant resources with the proper distribution and interconnections. The disclosed embodiments also allow dynamic changes of the resources and the connections of them depending on the virtual community changes, as well as the physical location of the users, the physical location of the interface equipment, and so on.

Figure 8:
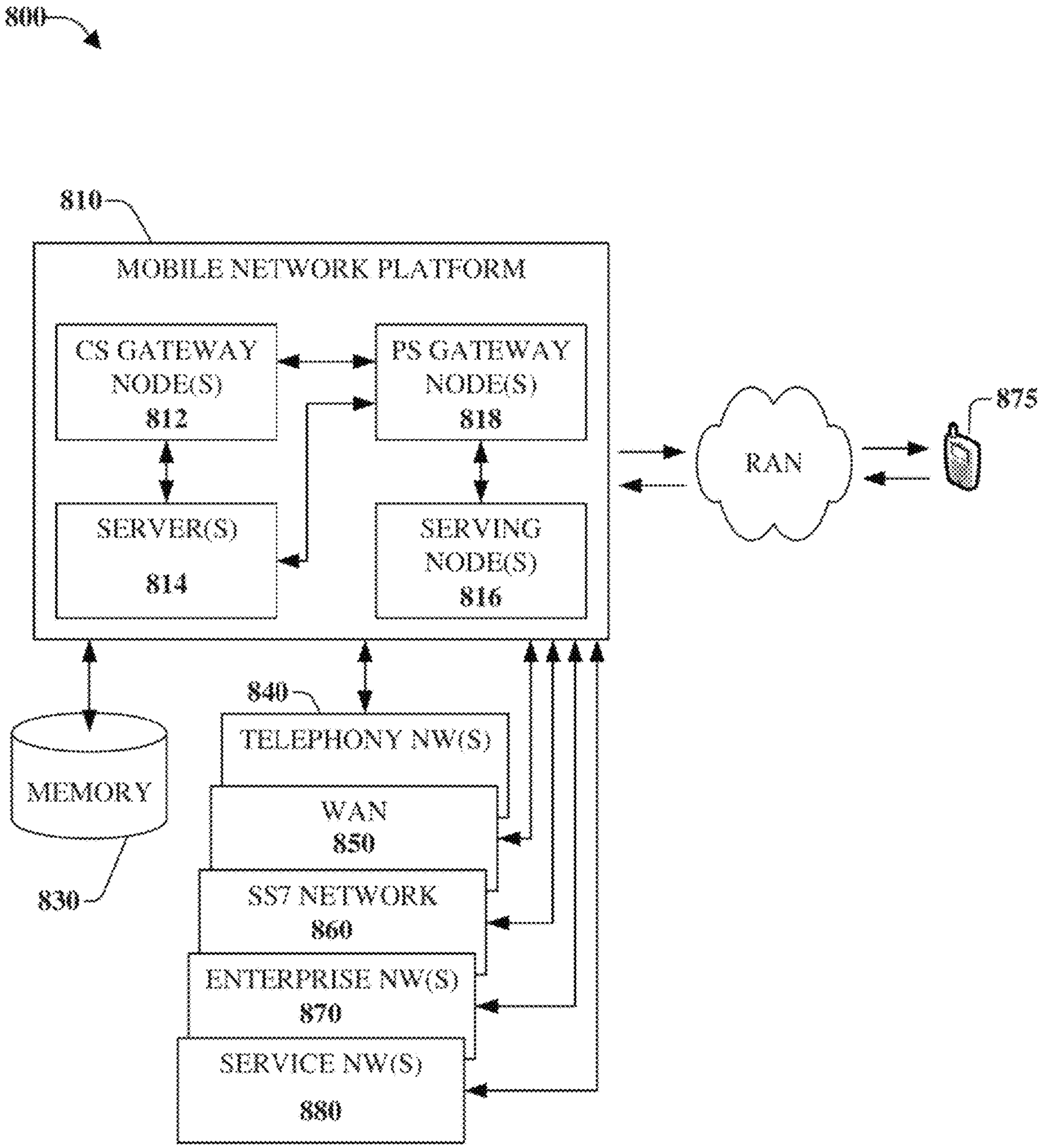
FIG. 8 illustrates an example block diagram of a non-limiting embodiment of a mobile network platform in accordance with various aspects described herein.

FIG. 8 presents an example embodiment 800 of a mobile network platform 810 that can implement and exploit one or more aspects of the disclosed subject matter described herein. Generally, wireless network platform 810 can include components, e.g., nodes, gateways, interfaces, servers, or disparate platforms, which facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 810 can be included in telecommunications carrier networks and can be considered carrier-side components as discussed elsewhere herein. Mobile network platform 810 includes CS gateway node(s) 812 which can interface CS traffic received from legacy networks such as telephony network(s) 840 (e.g., public switched telephone network (PSTN), or public land mobile network (PLMN)) or a signaling system #7 (SS7) network 860. Circuit switched gateway node(s) 812 can authorize and authenticate traffic (e.g., voice) arising from such networks. Additionally, CS gateway node(s) 812 can access mobility, or roaming, data generated through SS7 network 860; for instance, mobility data stored in a visited location register (VLR), which can reside in memory 830. Moreover, CS gateway node(s) 812 interfaces CS-based traffic and signaling and PS gateway node(s) 818. As an example, in a 3GPP UMTS network, CS gateway node(s) 812 can be realized at least in part in gateway GPRS support node(s) (GGSN). It should be appreciated that functionality and specific operation of CS gateway node(s) 812, PS gateway node(s) 818, and serving node(s) 816, is provided and dictated by radio technology(ies) utilized by mobile network platform 810 for telecommunication. Mobile network platform 810 can also include the MMEs, HSS/PCRFs, SGWs, and PGWs disclosed herein.

In addition to receiving and processing CS-switched traffic and signaling, PS gateway node(s) 818 can authorize and authenticate PS-based data sessions with served mobile devices. Data sessions can include traffic, or content(s), exchanged with networks external to the wireless network platform 810, like wide area network(s) (WANs) 850, enterprise network(s) 870, and service network(s) 880, which can be embodied in local area network(s) (LANs), can also be interfaced with mobile network platform 810 through PS gateway node(s) 818. It is to be noted that WANs 850 and enterprise network(s) 870 can embody, at least in part, a service network(s) such as IP multimedia subsystem (IMS). Based on radio technology layer(s) available in technology resource(s) 817, packet-switched gateway node(s) 818 can generate packet data protocol contexts when a data session is established; other data structures that facilitate routing of packetized data also can be generated. To that end, in an aspect, PS gateway node(s) 818 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 800, wireless network platform 810 also includes serving node(s) 816 that, based upon available radio technology layer(s) within technology resource(s) 817, convey the various packetized flows of data streams received through PS gateway node(s) 818. It is to be noted that for technology resource(s) 817 that rely primarily on CS communication, server node(s) can deliver traffic without reliance on PS gateway node(s) 818; for example, server node(s) can embody at least in part a mobile switching center. As an example, in a 3GPP UMTS network, serving node(s) 816 can be embodied in serving GPRS support node(s) (SGSN).

For radio technologies that exploit packetized communication, server(s) 814 in wireless network platform 810 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 810. Data streams (e.g., content(s) that are part of a voice call or data session) can be conveyed to PS gateway node(s) 818 for authorization/authentication and initiation of a data session, and to serving node(s) 816 for communication thereafter. In addition to application server, server(s) 814 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 810 to ensure network's operation and data integrity in addition to authorization and authentication procedures that CS gateway node(s) 812 and PS gateway node(s) 818 can enact. Moreover, provisioning server(s) can provision services from external network(s) like networks operated by a disparate service provider; for instance, WAN 850 or Global Positioning System (GPS) network(s) (not shown). Provisioning server(s) can also provision coverage through networks associated to wireless network platform 810 (e.g., deployed and operated by the same service provider), such as femto-cell network(s) (not shown) that enhance wireless service coverage within indoor confined spaces and offload RAN resources in order to enhance subscriber service experience within a home or business environment by way of UE 875.

It is to be noted that server(s) 814 can include one or more processors configured to confer at least in part the functionality of macro network platform 810. To that end, the one or more processors can execute code instructions stored in memory 830, for example. It should be appreciated that server(s) 814 can include a content manager, which operates in substantially the same manner as described hereinbefore.

In example embodiment 800, memory 830 can store information related to operation of wireless network platform 810. Other operational information can include provisioning information of mobile devices served through wireless network platform 810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 830 can also store information from at least one of telephony network(s) 840, WAN 850, enterprise network(s) 870, or SS7 network 860. In an aspect, memory 830 can be, for example, accessed as part of a data store component or as a remotely connected memory store.

Figure 9:
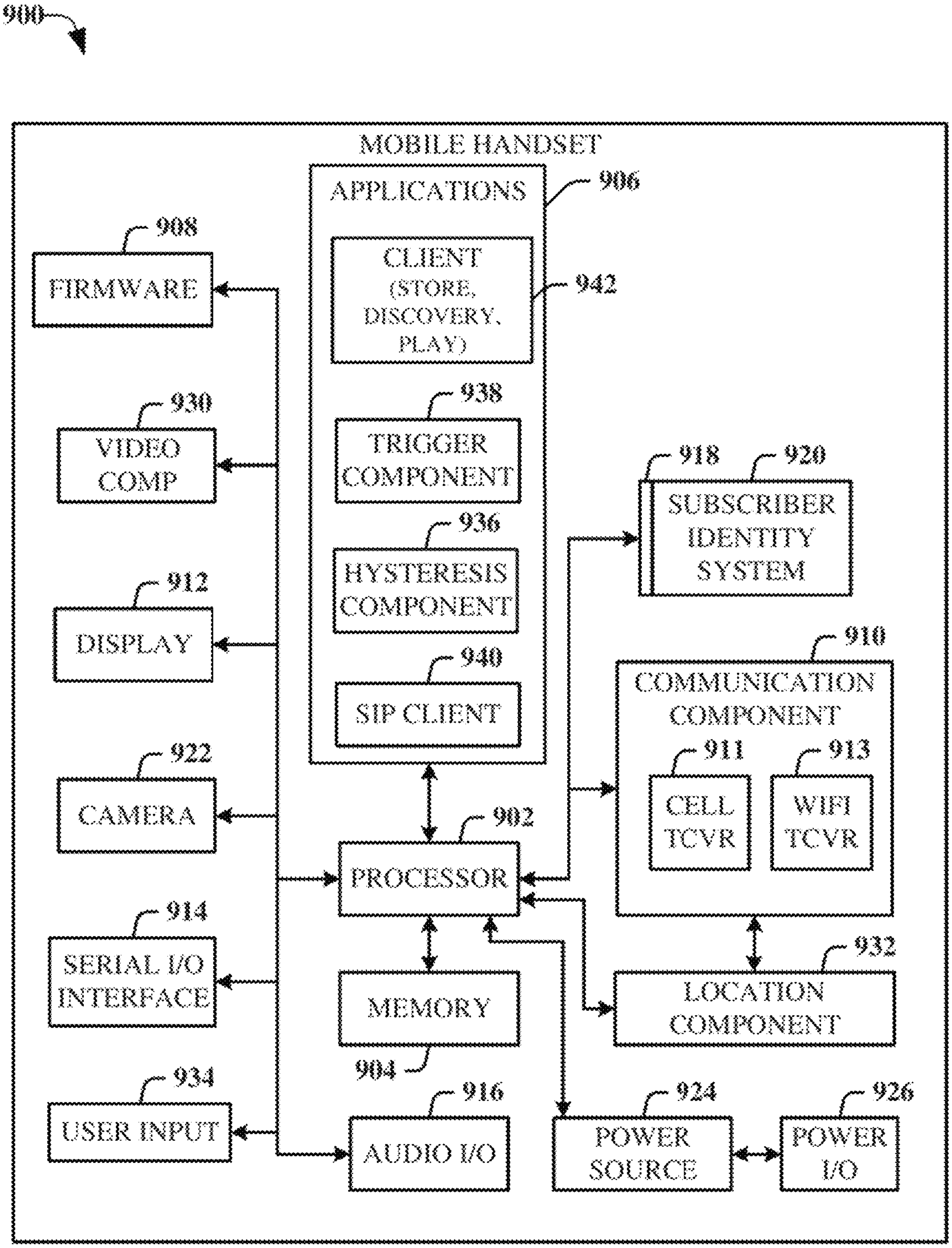
FIG. 9 illustrates an example, non-limiting, block diagram of a handset operable to engage in a system architecture that facilitates wireless communications according to one or more embodiments described herein.

Referring now to FIG. 9, illustrated is an example, non-limiting, block diagram of a handset 900 operable to engage in a system architecture that facilitates wireless communications according to one or more embodiments described herein. Although a mobile handset is illustrated herein, it will be understood that other devices can be a mobile device and/or UE, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908 and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920 and interfacing the SIM card 920 with the processor 902. However, it is to be appreciated that the SIM card 920 can be manufactured into the handset 900 and updated by downloading data and software. The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for a dual-mode GSM handset. The handset 900 can accommodate at least satellite radio services through a handset that can combine wireless voice and digital radio chipsets into a single handheld device.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A Basic Input/Output System (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems. Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For example, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc. A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or can include a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Moreover, terms such as "mobile device equipment," "mobile station," "mobile," subscriber station," "access terminal," "terminal," "handset," "communication device," "mobile device," "user equipment" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can include, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The terms "real-time," "near real-time," "dynamically," "instantaneous," "continuously," and the like are employed interchangeably or similarly throughout the subject specification, unless context warrants particular distinction(s) among the terms. It should be noted that such terms can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system comprising:

a processor; and a memory that stores executable instructions that, when executed by the processor, facilitate performance of operations, the operations comprising:

based on a request, selecting a first resource from a first group of resources associated with a physical world and a second resource from a second group of resources associated with a virtual world, wherein the first resource comprises a first network element, wherein the first network element comprises a first service-based architecture resource port, wherein the second resource comprises an avatar that is associated with a second service-based architecture resource port, and wherein the selecting comprises identifying, in accordance with the first service-based architecture resource port and the second service-based architecture resource port, a compatibility between the first network element and the avatar;

combining the first resource and the second resource, wherein the combining comprises creating a metaverse service that is responsive to the request, and wherein the combining comprises interconnecting the first service-based architecture resource port and the second service-based architecture resource port via an interface; and rendering information indicative of the metaverse service in response to the request, wherein the rendering includes rendering the avatar for presentation via a display.

2. The system of claim 1, wherein the first service-based architecture resource port comprises a logical port associated with the first network element.

3. The system of claim 1, wherein the first resource and the second resource further comprise respective voice related resources.

4. The system of claim 1, wherein the operations further comprise:

identifying a change to the first resource;

based on the change, selecting a third resource from the first group of resources; and adapting a capability of the metaverse service, wherein the adapting comprises replacing the first resource with the third resource.

5. The system of claim 1, wherein the display comprises a heads up display.

6. The system of claim 1, wherein the rendering further comprises outputting the information indicative of the metaverse service via a communication network configured to operate according to at least a fifth generation network communication protocol.

7. The system of claim 1, wherein the selecting comprises:

evaluating the first group of resources of the physical network and the second group of resources of the virtual network; and selecting the first resource from the first group of resources and the second resource from the second group of resources, wherein the selecting comprises identifying a compatibility between the first resource and the second resource.

8. A method comprising:

based on a request, selecting, by a processor, a first resource from a first group of resources associated with a physical world and a second resource from a second group of resources associated with a virtual world, wherein the first resource comprises a first network element, wherein the first network element comprises a first service-based architecture resource port, wherein the second resource comprises an avatar that is associated with a second service-based architecture resource port, and wherein the selecting comprises identifying, in accordance with the first service-based architecture resource port and the second service-based architecture resource port, a compatibility between the first network element and the avatar;

combining, by the processor, the first resource and the second resource, wherein the combining comprises creating a metaverse service that is responsive to the request, and wherein the combining comprises interconnecting the first service-based architecture resource port and the second service-based architecture resource port via an interface; and rendering, by the processor, information indicative of the metaverse service in response to the request, wherein the rendering includes rendering the avatar for presentation via a display.

9. The method of claim 8, wherein the first service-based architecture resource port comprises a logical port associated with the first network element.

10. The method of claim 8, wherein the first resource and the second resource further comprise respective voice related resources.

11. The method of claim 8, further comprising:

identifying, by the processor, a change to the first resource;

based on the change, selecting, by the processor, a third resource from the first group of resources; and adapting, by the processor, a capability of the metaverse service, wherein the adapting comprises replacing the first resource with the third resource.

12. The method of claim 8, wherein the display comprises a heads up display.

13. The method of claim 8, wherein the rendering further comprises outputting the information indicative of the metaverse service via a communication network configured to operate according to at least a fifth generation network communication protocol.

14. The method of claim 8, wherein the selecting comprises:

evaluating the first group of resources of the physical network and the second group of resources of the virtual network; and selecting the first resource from the first group of resources and the second resource from the second group of resources, wherein the selecting comprises identifying a compatibility between the first resource and the second resource.

15. A non-transitory machine-readable medium, comprising executable instructions that, when executed by a processor of network equipment, facilitate performance of operations, the operations comprising:

based on a request, selecting a first resource from a first group of resources associated with a physical world and a second resource from a second group of resources associated with a virtual world, wherein the first resource comprises a first network element, wherein the first network element comprises a first service-based architecture resource port, wherein the second resource comprises an avatar that is associated with a second service-based architecture resource port, and wherein the selecting comprises identifying, in accordance with the first service-based architecture resource port and the second service-based architecture resource port, a compatibility between the first network element and the avatar;

combining the first resource and the second resource, wherein the combining comprises creating a metaverse service that is responsive to the request, and wherein the combining comprises interconnecting the first service-based architecture resource port and the second service-based architecture resource port via an interface; and rendering information indicative of the metaverse service in response to the request, wherein the rendering includes rendering the avatar for presentation via a display.

16. The non-transitory machine-readable medium of claim 15, wherein the first service-based architecture resource port comprises a logical port associated with the first network element.

17. The non-transitory machine-readable medium of claim 15, wherein the first resource and the second resource further comprise respective voice related resources.

18. The non-transitory machine-readable medium of claim 15, wherein the operations further comprise:

identifying a change to the first resource;

based on the change, selecting a third resource from the first group of resources; and adapting a capability of the metaverse service, wherein the adapting comprises replacing the first resource with the third resource.

19. The non-transitory machine-readable medium of claim 15, wherein the display comprises a heads up display.

20. The non-transitory machine-readable medium of claim 15, wherein the rendering further comprises outputting the information indicative of the metaverse service via a communication network configured to operate according to at least a fifth generation network communication protocol.

* * * * *